(12) United States Patent
Donderici

(10) Patent No.: US 12,123,944 B2
(45) Date of Patent: Oct. 22, 2024

(54) GROUND-PENETRATING RADAR SENSORS ON VEHICLES FOR DETECTING UNDERGROUND FEATURES AND ROAD SURFACE FEATURES

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 364 days.

(21) Appl. No.: 17/588,555

(22) Filed: Jan. 31, 2022

(65) Prior Publication Data
US 2023/0243959 A1 Aug. 3, 2023

(51) Int. Cl.
*G01S 13/931* (2020.01)
*G01S 13/60* (2006.01)

(52) U.S. Cl.
CPC ............ *G01S 13/931* (2013.01); *G01S 13/60* (2013.01); *B60G 2400/82* (2013.01); *B60G 2401/174* (2013.01)

(58) Field of Classification Search
CPC .............................. G01S 13/931; G01S 13/885
USPC ...................................................... 342/22, 59
See application file for complete search history.

(56) References Cited

U.S. PATENT DOCUMENTS

| | | | |
|---|---|---|---|
| 2017/0108863 A1* | 4/2017 | Chundrlik, Jr. .... | B60W 50/0205 |
| 2022/0099522 A1* | 3/2022 | Ham ...................... | E01D 22/00 |
| 2023/0115265 A1* | 4/2023 | Butt ........................ | G01S 7/027 342/22 |
| 2023/0141585 A1* | 5/2023 | Newman ................ | G06F 9/451 427/136 |

FOREIGN PATENT DOCUMENTS

DE      102020113149 B3 *   6/2021   .......... B60W 60/001

* cited by examiner

*Primary Examiner* — Vladimir Magloire
*Assistant Examiner* — Erik K Hodac
(74) *Attorney, Agent, or Firm* — Michael DiCato

(57) ABSTRACT

The present technology is directed to identifying road surface features and underground features using a ground-penetrating radar (GPR) sensor. The present technology may include activating the GPR sensor on a vehicle to transmit a pulsed electromagnetic signal toward a ground surface. The present technology may also include receiving the pulsed electromagnetic signal reflected from the road surface features and underground features by the GPR sensor. The present technology may also include filtering the pulsed electromagnetic signal to generate a shallow-GPR data or deep-GPR data, wherein the shallow-GPR data is used to identify the road surface features and the deep-GPR is used to identify the underground features. The present technology may also include adjusting operational parameters based on at least one of the road surface features and the underground features.

19 Claims, 7 Drawing Sheets

GROUND-PENETRATING RADAR SENSORS ON VEHICLES FOR DETECTING UNDERGROUND FEATURES AND ROAD SURFACE FEATURES

TECHNICAL FIELD

The subject technology pertains to ground penetrating radar (GPR) for detecting underground features and road surface features, and more specifically pertains to using the underground features detected using GPR to localize a vehicle on the road.

BACKGROUND

An autonomous vehicle (AV) is a motorized vehicle that can navigate without a human driver. An exemplary autonomous vehicle includes a plurality of sensor systems, including a camera sensor system, a Light Detection and Ranging (LiDAR) sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. In some applications, these systems utilize a perception system (or perception stack) that implements various computing vision techniques to reason about the surrounding environment.

SUMMARY

In one aspect, the present technology is directed to identifying road surface features and underground features using a ground-penetrating radar (GPR) sensor. The present technology may include activating the GPR sensor on a vehicle to transmit a pulsed electromagnetic signal toward a ground surface. The present technology may also include receiving the pulsed electromagnetic signal reflected from the road surface features and underground features by the GPR sensor. The present technology may also include filtering the pulsed electromagnetic signal to generate a shallow-GPR data or deep-GPR data, wherein the shallow-GPR data is used to identify the road surface features and the deep-GPR is used to identify the underground features. The present technology may also include adjusting operational parameters based on at least one of the road surface features and the underground features.

Additional aspects, embodiments, and features are set forth in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which form a part of this disclosure.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
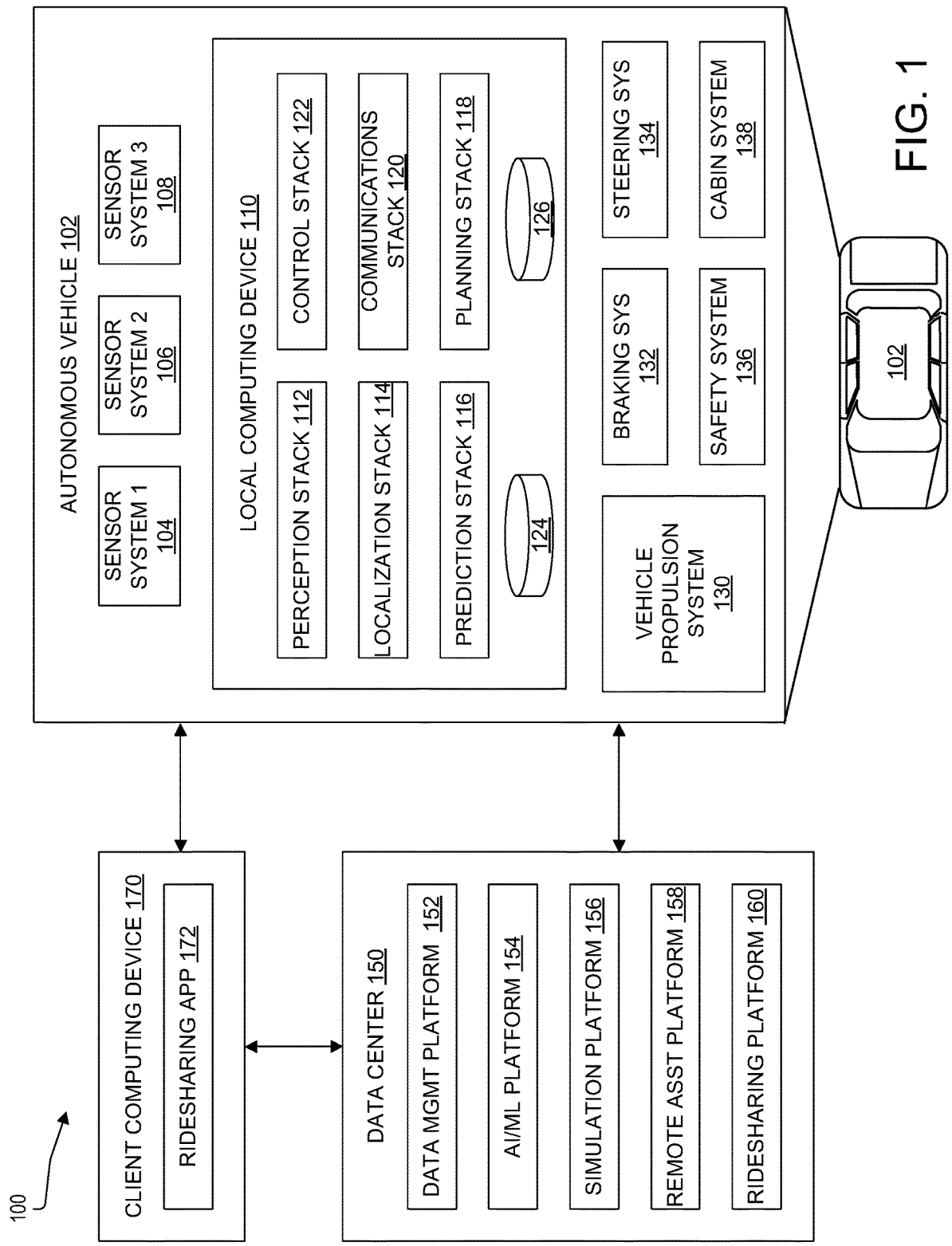
FIG. 1 illustrates an example of a system for managing one or more Autonomous Vehicles (AVs) in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form to facilitate describing one or more aspects. Further, it is to be understood that functionality described as being carried out by certain system components may be performed by more or fewer components than shown.

As described herein, one aspect of the present technology is gathering and using data from various sources to improve the ride quality and ride experience for a passenger in an autonomous vehicle. The present disclosure contemplates that in some instances, this gathered data may include personal information. The present disclosure contemplates that the entities involved with such personal information respect and value privacy policies and practices.

Above ground road surface features may change, making them unreliable for localizing a vehicle on the road. For example, road or road boundaries may change. Lane markings, road shoulder, or speed bumps may also change. However, underground features, such as buried pipes or cables, are less susceptible to changes.

Standard mapping relies on Global Positioning System (GPS), stored maps of lane boundaries or other features, and common sensors, such as camera sensor systems, Light Detection and Ranging (LiDAR) sensors, or radar sensors use to detect the lane boundaries and other features. However, these common sensors are direct-object-detecting sensors, which are susceptible to adverse environments, such as snowy, rainy, or foggy weather. Also, the underground features are not detectable by using direct-object-detecting sensors such as LiDAR sensors or camera sensors.

Aspects of the disclosed technology provide solutions for generating a map of the underground features by using ground-penetrating radar (GPR) sensors. The map of underground features can improve the accuracy of locating the position of the vehicle relative to the underground features. The present technology uses GPR data from the GPR sensors to identify underground features and then locate the vehicle's position relative to the underground features.

In some aspects, when the vehicle is an autonomous vehicle (AV), the present technology may also provide the GPR data to a localization stack, which can use the GPR data along with the map of the underground features relative to surface features to help navigate the AV. In some aspects, the GPR data may be useful in adverse weather conditions, such as snow, rainy, or foggy conditions.

In some aspects, the GPR data collected from the GPR sensors on a vehicle can determine road surface features, road surface conditions, or characteristics. When the vehicle is an AV, the present technology may also provide the GPR data to a planning stack, which can modify the operation of the vehicle.

In some aspects, a map of the underground features can be created using the GPR data. The underground features can be detected by using the GPR sensors. Then, the underground features can be compared with an existing map of underground features and can be used to update the existing map of underground features. The map of underground features can be used to locate the vehicle's position. The underground features are related to surface localization features, such as coordinates (e.g., GPS) of the vehicle on the road, lane lines on the road, or road boundaries.

FIG. 1 illustrates an example of an AV management system 100. One of the ordinary skills in the art will understand that there can be additional or fewer components in similar or alternative configurations for the AV management system 100 and any system discussed in the present disclosure. The illustrations and examples provided in the present disclosure are for conciseness and clarity. Other embodiments may include different numbers and/or types of elements, but one of the ordinary skills in the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPR sensors, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, sensor system 104 can be a camera system, sensor system 106 can be a LIDAR system, and sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The bounding area may by defined on grid that includes a rectangular, cylindrical or spherical projection of the camera or LIDAR data.

The mapping and localization stack 114 can determine the AV's position and orientation (pose) using different methods from multiple systems (e.g., GPR, GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along with the path corresponding to a predicted location of the object along the path at future time intervals along with an expected error value for each of the points that indicates a probabilistic deviation from that point. In some embodiments, the prediction stack 116 can output a probability distribution of likely paths or positions that the object is predicted to take.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can include multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., the direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left-turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPR sensor data, GPS data, and other sensor data that the data center 150 can use for creating or updating AV geospatial data or for creating simulations of situations encountered by AV 102 for future testing or training of various machine-learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine-learning (AI/ML) platform 154, a simulation platform 156, remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having differently structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time-series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine-learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine-learning models; evaluate, refine, and deploy the models; maintain, monitor, and retrain the models; and so on.

The simulation platform 156 can enable testing and validation of the algorithms, machine-learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other systems of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general-purpose computing devices for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
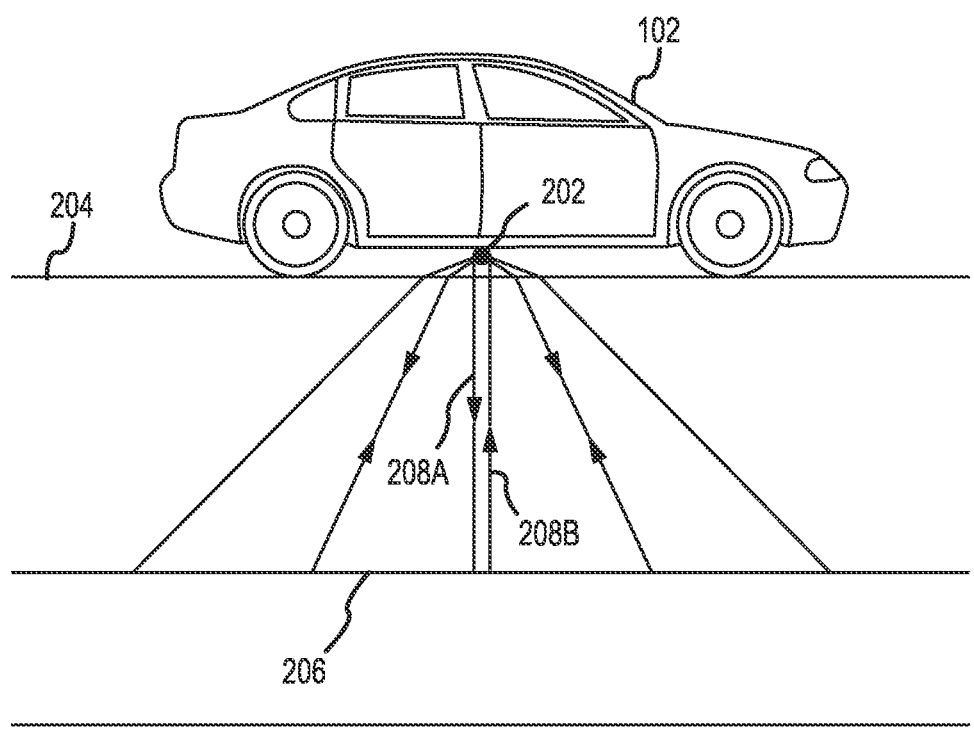
FIG. 2 is a diagram illustrating a GPR sensor under a vehicle for collecting GPR data including underground features in accordance with some aspects of the present technology.

FIG. 2 is a diagram illustrating a GPR sensor under a vehicle for collecting GPR data including underground features in accordance with some aspects of the present technology. The GPR sensor can detect underground features, such as pipes or cables, and then locate the position of the vehicle relative to the underground features. As illustrated, GPR sensor 202 under vehicle 102 uses radar pulses to image underground features 206 while vehicle 202 drives on ground surface 204. GPR sensor 202 serves as a transmitter and sends a pulsed electromagnetic signal 208A toward a ground surface 204. GPR sensor 202 may also serve as a receiver to receive or detect reflected signals from underground features 206. GPR sensor 202 is positioned above ground surface 204 and faces toward ground surface 204. The pulsed electromagnetic signals may radiate in various directions toward ground surface 204 as illustrated.

GPR sensor may use high-frequency radio waves in the range 1 MHz to 10 GHz. As illustrated, GPR sensor 202 emits an electromagnetic signal 208A into the ground under the ground surface 204. When the electromagnetic signal 208A encounters underground features 206, such as a buried pipe, which have a different electric resistance, electric permittivity, or magnetic permeability from the ground, the electromagnetic signal 208A may be reflected or scattered back to the ground surface 204 and then GPR sensor 202 serves as a receiver and records a reflected electromagnetic signal 208B.

The penetration depth of the electromagnetic signal for detecting the underground features or near-surface features may be up to 30 meters. The electromagnetic signals have smaller penetration depths at higher frequencies or more conductive ground materials, although higher frequencies may provide better resolution than lower frequencies.

The electromagnetic signal 208B received by GPR sensor 202 can be filtered to provide information on the underground features or deep-surface features. In some aspects, the underground features or deep-surface features are from 0.3 m to 30.0 m from the ground surface.

The electromagnetic signal 208B received by GPR sensor 202 can also be filtered to provide information on road surface features. In some aspects, the road surface features 206 are within 0.3 m from the ground surface 204.

In some aspects, the GPR transmitter is a separate component from the GPR receiver.

The GPR data collected from the GPR sensors on a vehicle can determine road surface features, road surface conditions, or characteristics, which can be used to modify the operation of the vehicle. For example, the driving modes may vary for different road surface conditions. The road surface conditions may affect the ride quality predictions. The road surface conditions may require general road maintenance. For example, some roads may be cracked or have holes detected by the GPR sensor while the vehicles drive on the roads.

Figure 3:
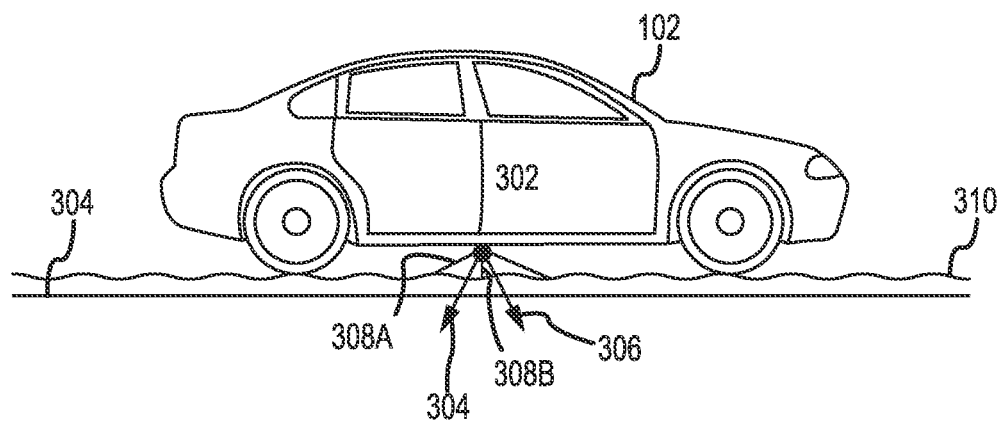
FIG. 3 is a diagram illustrating a GPR sensor under a vehicle for collecting GPR data including road surface features in accordance with some aspects of the present technology.

FIG. 3 is a diagram illustrating a GPR sensor under a vehicle for collecting GPR data including road surface features in accordance with some aspects of the present technology. As illustrated, GPR sensor 302 can be used to detect road surface features, including cracks 304, holes 306 under snow 310. GPR sensor 302 may be in contact with the ground surface 312 or snow 310. GPR sensor 302 may be attached to a mechanical suspension mechanism that keeps a distance between the GPR sensor 302 and the ground surface 312 or snow 310, while protecting the GPR sensor from impacting the objects on the ground surface 312. Mechanical suspension mechanism maybe in physical contact with the AV 102, or the ground surface 312. GPR sensor 302 serves as a transmitter and emits pulsed electromagnetic signals 308A and also serves as a receiver and receives reflected or scattered electromagnetic signals 308B from cracks 304, or holes 306.

In some variations, the GPR sensor 302 is at a fixed distance from the ground.

In some variations, the GPR sensor 302 is at an adjustable distance from the ground to avoid damage.

Figure 4:
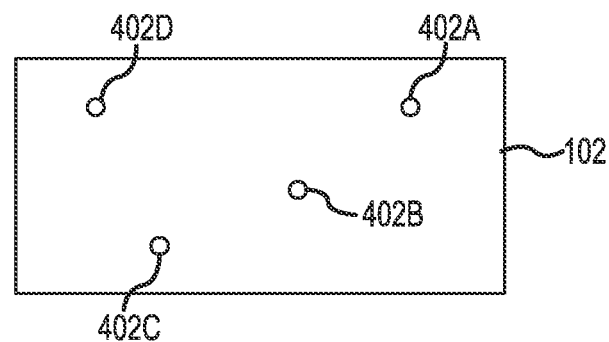
FIG. 4 is a bottom view of a vehicle including multiple GPR sensors positioned under the vehicle in accordance with some aspects of the present technology.

In some aspects, the present technology may use multiple-point GPRs or multiple GPRs placed at intervals. FIG. 4 is a bottom view of a vehicle including multiple GPR sensors positioned under the vehicle in accordance with some aspects of the present technology. As illustrated, multiple GPR sensors 402A-D may be placed under vehicle 102 at different positions. The GPR sensors 402A-D are suspended above the ground surface and face toward the ground surface. The multiple GPR sensors allow the collection of data from different parts of a road. In one embodiment, GPRs may be placed in array formation along a line. In another embodiment, GPRs may be placed in staggered formation to reduce the spacing in the direction across the road.

Also, the GPR sensors 402A-D may be selectively activated at different time intervals. For example, a first GPR sensor may activate to transmit a second pulsed electromagnetic signal at the first time. A second GPR sensor may activate to transmit a second pulsed electromagnetic signal at a second time.

In some variations, these GPR sensors 402A-D may generate pulsed radar signals in different frequencies, or different bandwidths, or different shaped pulses, among others, to increase the detectability of underground features or road surface features. As an example, higher frequencies can be used to detect shallower or smaller features, or lower frequencies may be used to detect deeper or larger features.

In some variations, one or more of these multiple GPR sensors may be able to adjust its height from the ground to avoid damages.

In some variations, a lower surface of the vehicle is configured to direct reflections off the ground surface away from the GPR sensor so they do not interfere with reflections coming from subsurface structures.

Figure 5:
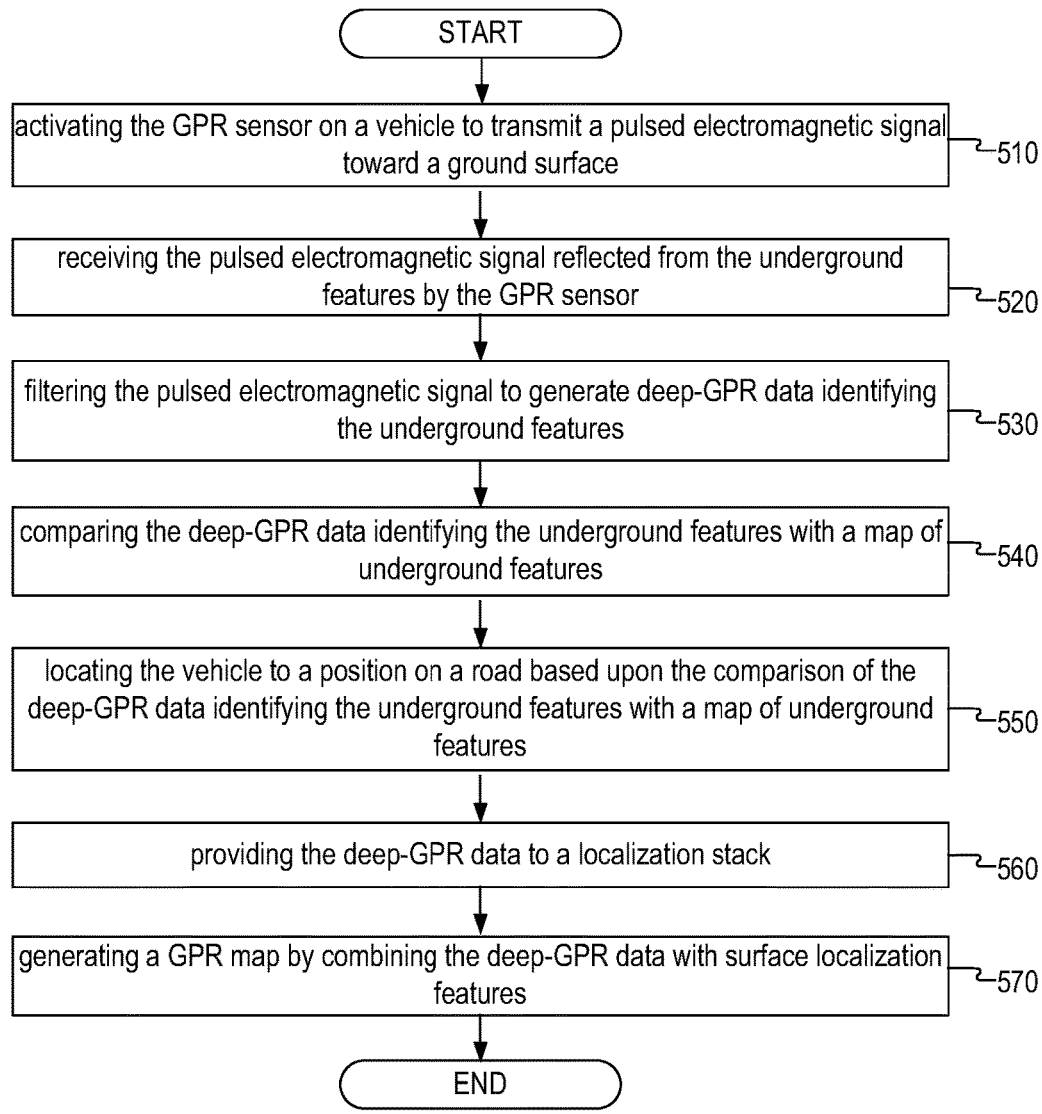
FIG. 5 illustrates an example method for locating the vehicle to a position on a road by using GPR sensors in accordance with some aspects of the present technology.

FIG. 5 illustrates an example method 500 for locating the position of the vehicle on road by using GPR sensors in accordance with some aspects of the present technology. Although the example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements method 500 may perform functions at substantially the same time or in a specific sequence.

According to some examples, method 500 may include activating the GPR sensor on a vehicle to transmit a pulsed electromagnetic signal toward a ground surface at block 510. For example, the local computing device 110 as illustrated in FIG. 1 may activate the GPR sensor on a vehicle to transmit a pulsed electromagnetic signal toward a ground surface.

In some variations, the vehicle may include more than one GPR sensor. Method 500 may include selectively activating one GPR sensor of the more than one GPR sensor based on the map of the underground features and coordinating with the map of surface localization features when a location of the vehicle on the surface indicates that the one GPR sensor of the more than one GPR sensors is best positioned to detect the underground features.

In some variations, method 500 may include selectively deactivating the GPR sensor when the underground features are not distinct enough to be used to locate the vehicle to the position on the road. For example, the local computing device 110 as illustrated in FIG. 1 may selectively deactivate the GPR sensor when the underground features are not distinct enough to be used to locate the vehicle to the position on the road.

In some aspects, the GPR sensor serves as a GPR transmitter.

In some aspects, the GPR sensor is on the vehicle and is suspended above a ground surface. The GPR sensor also faces toward the ground surface.

According to some examples, method 500 may include receiving the pulsed electromagnetic signal reflected from the underground features by the GPR sensor at block 520. For example, the local computing device 110 as illustrated in FIG. 1 may receive the pulsed electromagnetic signal reflected from the underground features by the GPR sensor.

In some aspects, the GPR sensor serves as both the GPR transmitter and the GPR receiver.

In some aspects, the GPR sensor severs as a GPR transmitter only and the GPR receiver is a separate component from the GPR transmitter.

According to some examples, method 500 may include filtering the pulsed electromagnetic signal to generate deep-GPR data identifying the underground features at block 530. For example, the local computing device 110 as illustrated in FIG. 1 may filter the pulsed electromagnetic signal to generate deep-GPR data identifying the underground features.

In some aspects, the filtering the pulsed electromagnetic signal is time-based, distance-based, or road material-based. In some aspects, the road material includes concrete, dirt, or asphalt.

According to some examples, method 500 may include comparing the deep-GPR data identifying the underground features with a map of underground features at block 540. For example, the local computing device 110 as illustrated in FIG. 1 may compare the deep-GPR data identifying the underground features with a map of underground features.

In some variations, the map of underground features is coordinated with a map of surface localization features. A position of the underground features is known relative to the surface localization features. The surface localization features may include coordinates that correspond to a location on a road or road boundaries, such as lane markings, a road shoulder, or speed bumps.

In some variations, the comparing the deep-GPR data identifying the underground features with the map of underground features may determine a location distribution. The location distribution may be a two-dimensional spatial image, where at each point is associated with a probability distribution or a score. The parts of the image where the probability distribution or score is the maximum indicates the most likely location.

Comparisons can be performed between GPR waveforms to determine the location distribution, which can be a Gaussian distribution. The location distribution may be computed by taking the difference between the previously stored GPR waveforms M(x, y, t) and the received GPR waveform G(t) for each spatial point on the map to yield the residual R(x, y, t)=M(x, y, t)−(t), summing the differences in time to calculate a total difference for each spatial point D(x, y)=SUM_t(|R(x, y, OD), and applying a Gaussian function on total difference to calculate the score for each spatial point S(x, y)=Gaussian(D(x, y), sigma). The location distribution may be obtained by normalizing the scores to make the sum of scores a fixed value (e.g. a fixed value of 1) P(x, y)=S(x, y)/SUM_xy((x, y)). The extent of the Gaussian function, sigma, can be adjusted to match the expected uncertainty in the system.

According to some examples, method 500 may include locating the vehicle to a position on a road based upon the comparison of the deep-GPR data identifying the underground features with the map of underground features at block 550. For example, the local computing device 110 as illustrated in FIG. 1 may locate the vehicle to a position on a road based upon the comparison of the deep-GPR data identifying the underground features with a map of underground features.

In some variations, the locating the vehicle to a position may include determining the position of the vehicle based upon the first location and the location distribution. The first location of the vehicle is determined based upon a weighted average of GPR data. As an example, a joint distribution for the location distribution can be calculated from GPR and kinematic calculation result $x_g$, and $y_g$: J(x, y)=P(x, y)*Gaussian($x_g$, $y_g$, sigma2), where $x_g$ and $y_g$ are estimates of the current location of the vehicle calculated from the previous location of the vehicle, orientation of the vehicle, and speed of the vehicle. The current location of the vehicle is calculated from the maximum of the joint distribution $x_{g2}$, $y_{g2}$=argmax(J(x, y)). The extent of the Gaussian function, sigma2, can be adjusted to match the uncertainty in the kinematic calculation.

In some variations, the locating the vehicle to a position on a road includes locating the vehicle to a position in a lane on the road.

In some variations, method 500 may include navigating the vehicle based upon the position of the vehicle and adjusting the trajectory or path of the vehicle based upon the position of the vehicle.

According to some examples, method 500 may include providing the deep-GPR data to a localization stack at block 560. The localization stack 114 as illustrated in FIG. 1 uses the deep-GPR data along with the map of underground features relative to the map of surface features.

According to some examples, method 500 may include generating a GPR map by combining the deep-GPR data with surface localization features at block 570. For example, the local computing device 110 as illustrated in FIG. 1 may generate a GPR map by combining the deep-GPR data with surface localization features. The surface localization features may include coordinates that correspond to a location on a road or road boundaries, such as lane markings or a road shoulder.

In some variations, the generating the GPR map includes updating the map of underground features by adding the deep-GPR data.

The location of the vehicle determined based upon the deep-GPR data is more accurate than the location based upon the GPS or LiDAR sensors and cameras without the deep-GPR data. The more accurate location of the vehicle can help navigate the AV.

According to some examples, method 500 may include providing the location of the vehicle to the planning stack 118 to navigate the AV. For example, the planning stack may keep the AV on the road with the GPR data. The planning stack 118 may also navigate the AV toward a concrete or paved road from a dirt road.

According to some examples, method 500 may include adjusting operational parameters based on the underground features. For example, method 500 may include adjusting the operational parameters based on the position. The operational parameters are adjusted based on the provided deep-GPR data.

Figure 6:
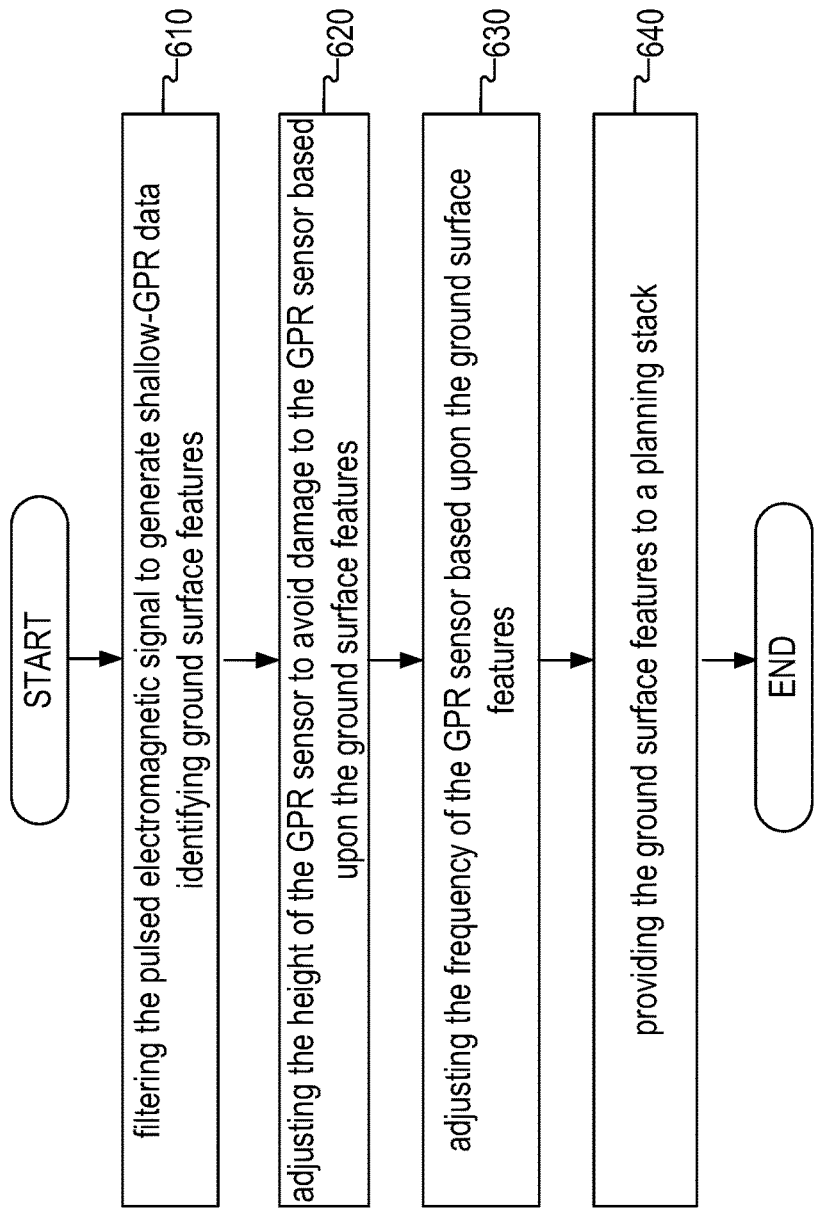
FIG. 6 illustrates an example method for detecting road surface conditions using GPR sensors in accordance with some aspects of the present technology.

FIG. 6 illustrates an example method 600 for detecting road surface conditions using GPR sensors in accordance with some aspects of the present technology. Although the example method 600 depicts a particular sequence of operations, the sequence may be altered without departing from the scope of the present disclosure. For example, some of the operations depicted may be performed in parallel or in a different sequence that does not materially affect the function of method 600. In other examples, different components of an example device or system that implements method 600 may perform functions at substantially the same time or in a specific sequence.

According to some examples, method 600 may include filtering the pulsed electromagnetic signal to generate shallow-GPR data identifying ground surface features at block 610. For example, the local computing device 110 as illustrated in FIG. 1 may filter the pulsed electromagnetic signal to generate shallow-GPR data identifying ground surface features.

In some aspects, the filtering the pulsed electromagnetic signal is time-based, distance-based, or road material-based. The road material includes concrete, dirt, or asphalt.

In some aspects, the road surface features may include one or more of concrete road surfaces, asphalt road surfaces, dirt road surfaces, cracked road surfaces, or holes on a road surface, which is a type of ground surface.

In some aspects, the road surface features may include weather conditions. The weather conditions may be snowy, rainy, or foggy. For example, when snow may cover the road, the GPR sensor may help locate if the vehicle is on the paved road or dirt road. Also, when it rains heavily or it is foggy, the GPR sensor may help if the vehicle is on the right lane and not driving on the opposite lane to run into car accidents.

According to some examples, method 600 may include adjusting the height of the GPR sensor to avoid damage to the GPR sensor based upon the road surface features at block 620. For example, the local computing device 110 as illustrated in FIG. 1 may adjust the height of the GPR sensor to avoid damage to the GPR sensor based upon the road surface features.

According to some examples, method 600 may include adjusting the frequency of the GPR sensor based upon the road surface features at block 630. For example, the local computing device 110 as illustrated in FIG. 1 may adjust the frequency of the GPR sensor based upon the road surface features. For example, a first GPR sensor can be used to detect surface conditions, and based on the surface conditions, the local computing device can adjust a frequency of a second GPR sensor to get better performance with the present surface conditions. For example, if the ground surface is wet, it be beneficial to adjust a frequency of the second GPR sensor to better detect subsurface features.

According to some examples, method 600 may include providing the road surface features to a planning stack at block 640. For example, the local computing device 110 as illustrated in FIG. 1 may provide the road surface features to the planning stack 118.

For example, the planning stack 118 may modify the operation of the AV. For example, when the road surface features (e.g. holes) are present, the AV may reduce speeds to provide smoother ride than at higher speeds.

According to some examples, method 600 may include adjusting operational parameters based on at least one of the road surface features. For example, the operational parameters are adjusted based on the provided shallow-GPR data.

In some aspects, the GPR data may not be helpful if there are no discernable underground features present or the underground features are changed. In this case, the vehicle may rely on GPS, data from LiDAR sensors, cameras, radar sensors.

EXAMPLES

The following examples are for illustration purposes only. It will be apparent to those skilled in the art that many modifications, both to materials and methods, may be practiced without departing from the scope of the disclosure.

Figure 7:
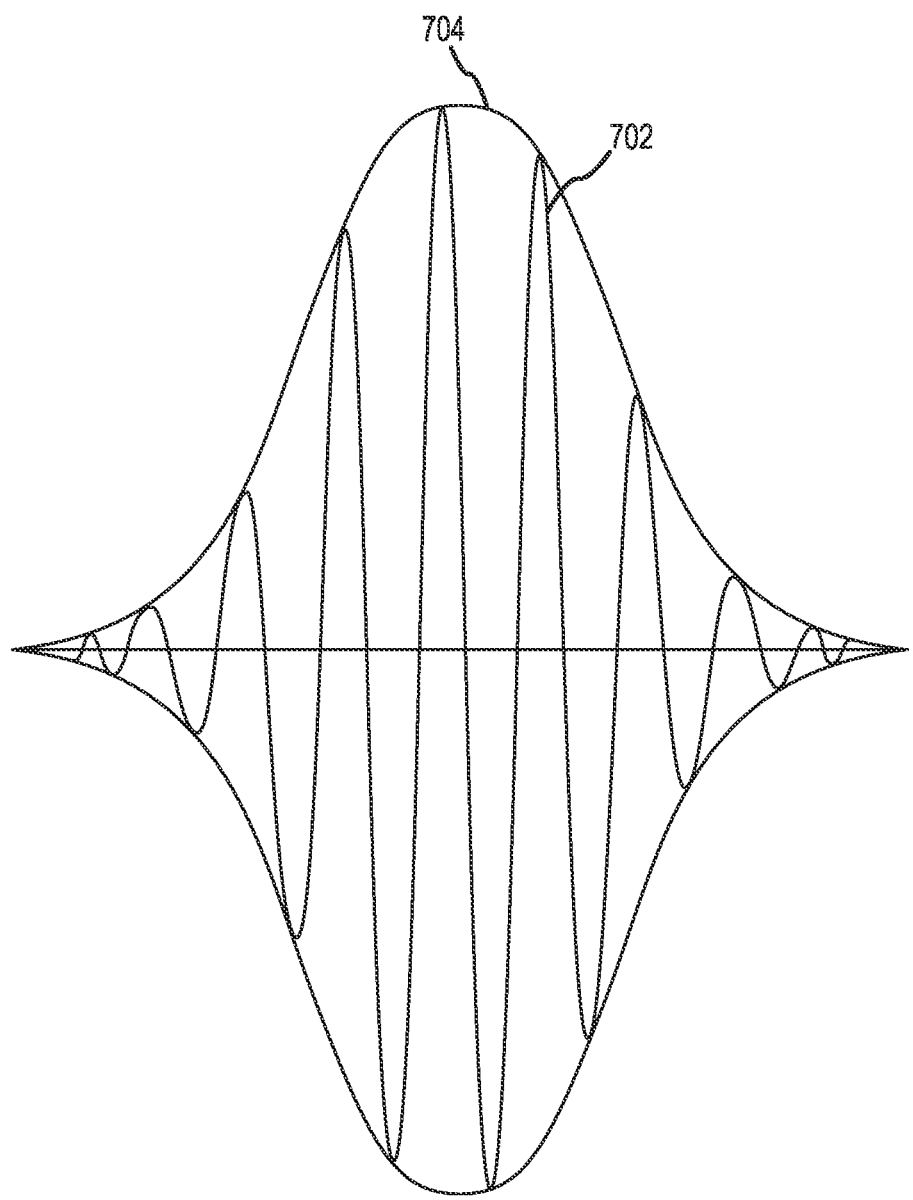
FIG. 7 illustrates a pulsed electromagnetic signal transmitted by a GPR sensor in accordance with some aspects of the present technology.

FIG. 7 illustrates a pulsed electromagnetic signal transmitted by a GPR sensor in accordance with some aspects of the present technology. As illustrated, a pulsed electromagnetic signal or radar signal 702 has an amplitude envelope 704 (e.g. Gaussian).

For detecting underground features, the electromagnetic signal has a radio spectrum with a wavelength ranging from 1 to 100 mm in the ground such that the GPR sensor has a resolution of 10 mm or 1 cm. In some variations, the pulsed radar signal has a center frequency from 10 MHz to 1 GHz.

For detecting surface features, the electromagnetic signal has a radio spectrum with a wavelength ranging from 1 to 10 mm in the ground such that the GPR sensor has a resolution of 1 mm or 0.1 cm. In some variations, the pulsed radar signal has a center frequency from 1 MHz to 10 GHz.

Figure 8:
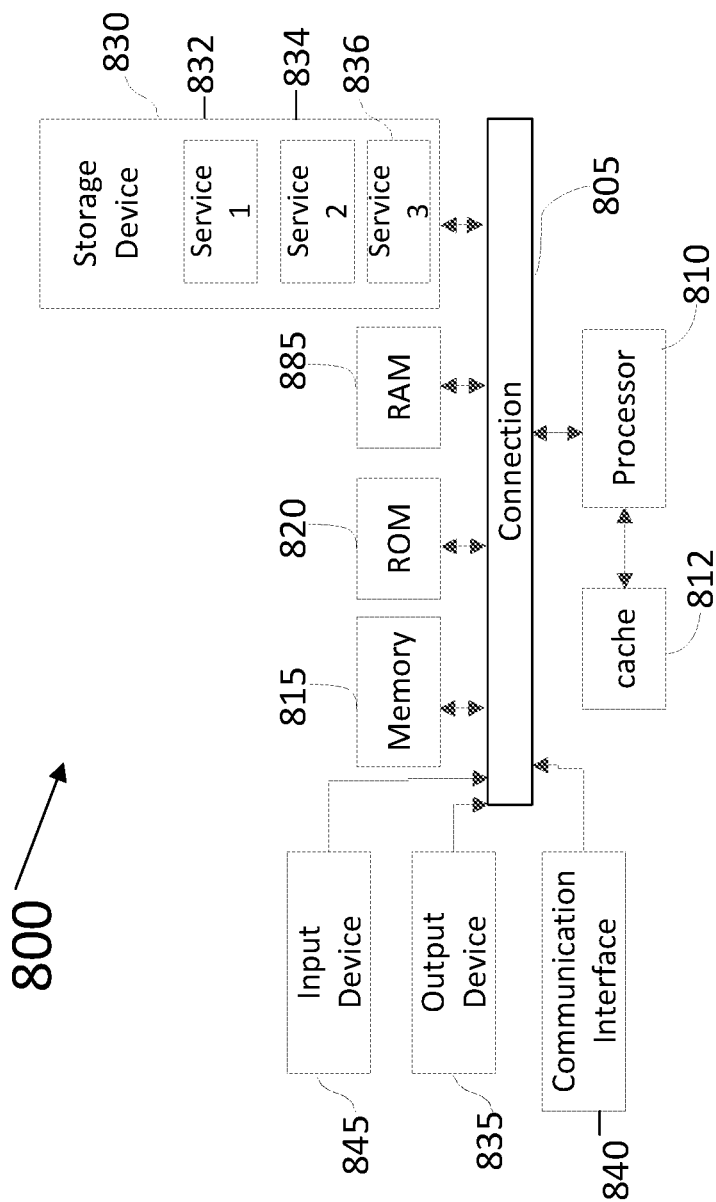
FIG. 8 is an example of a computing system in accordance with some aspects of the present technology.

FIG. 8 shows an example of computing system 800, which can be, for example, used for all the calculations as discussed above, or can be any computing device making up the local computing system 110, remote computing system 150, (potential) passenger device executing rideshare app 170, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

The example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, close to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of many output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 830 can include software services, servers, services, etc., and when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can include, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can include hardware, firmware, and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for identifying road surface features and underground features using a ground penetrating radar (GPR) sensor, the method comprising:
    activating the GPR sensor on a vehicle to transmit a pulsed electromagnetic signal toward a ground surface, wherein the vehicle comprises more than one GPR sensor;
    receiving the pulsed electromagnetic signal reflected from the road surface features and the underground features by the GPR sensor;
    filtering the pulsed electromagnetic signal to generate shallow-GPR data or deep-GPR data, wherein the shallow-GPR data is used to identify the road surface features and the deep-GPR data is used to identify the underground features;
    selectively activate one GPR sensor of the more than one GPR sensors based on a map of the underground features and coordinating with a map of surface localization features, when a location of the vehicle on the surface indicates that the one GPR sensor of the more than one GPR sensors is best positioned to detect the underground features; and
    adjusting operational parameters based on at least one of the road surface features and the underground features.

2. The method of claim 1, further comprising comparing the deep-GPR data identifying the underground features with the map of underground features; and
    locating the vehicle to a position on a road based upon the comparison of the deep-GPR data identifying the underground features with the map of the underground features; and
    adjusting the operational parameters based on the position.

3. The method of claim 1, wherein the underground features have a depth up to 30 meters.

4. The method of claim 1, further comprising generating a GPR map by combining the deep-GPR data with surface localization features.

5. The method of claim 4, wherein the surface localization features comprise coordinates that correspond to a location on a road or road boundaries.

6. The method of claim 4, wherein the generating the GPR map comprises updating the map of underground features by adding the deep-GPR data.

7. A system for identifying road surface features and underground features using a ground penetrating radar (GPR) sensor, the system comprising:
    a storage device configured to store instructions;
    a processor configured to execute the instructions and cause the processor to:
        activate the GPR sensor on a vehicle to transmit a pulsed electromagnetic signal toward a ground surface, wherein the vehicle comprises more than one GPR sensor;
        receive the pulsed electromagnetic signal reflected from the road surface features and the underground features by the GPR sensor;

filter the pulsed electromagnetic signal to generate shallow-GPR data or deep-GPR data, wherein the shallow-GPR data is used to identify the road surface features and the deep-GPR data is used to identify the underground features;

selectively activate one GPR sensor of the more than one GPR sensors based on a map of the underground features and coordinating with a map of surface localization features, when a location of the vehicle on the surface indicates that the one GPR sensor of the more than one GPR sensors is best positioned to detect the underground features; and adjust operational parameters based on the at least one of the road surface features and the underground features.

8. The system of claim 7, wherein a position of the underground features is known relative to the surface localization features, wherein the vehicle is an autonomous vehicle (AV).

9. The system of claim 7, wherein the processor is configured to execute the instructions and cause the processor to provide the deep-GPR data to a localization stack, wherein the operational parameters are adjusted based on the provided deep-GPR data.

10. The method of claim 9, wherein the localization stack uses the deep-GPR data along with the map of underground features relative to the map of surface localization features.

11. The system of claim 7, wherein the processor is configured to execute the instructions and cause the processor to selectively deactivate the GPR sensor when the underground features are not distinct enough to be used to locate the vehicle to the position on the road.

12. The system of claim 7, wherein the electromagnetic signal has a frequency from 1 MHz to 10 GHz.

13. The system of claim 7, wherein the processor is configured to execute the instructions and cause the processor to provide the road surface features to a planning stack.

14. A non-transitory computer readable medium for identifying road surface features and underground features using a ground penetrating radar (GPR) sensor, the non-transitory computer readable medium comprising instructions, the instructions, when executed by a computing system, cause the computing system to:

activate the GPR sensor on a vehicle to transmit a pulsed electromagnetic signal toward a ground surface, wherein the vehicle comprises more than one GPR sensor;

receive the pulsed electromagnetic signal reflected from the road surface features and the underground features by the GPR sensor;

filter the pulsed electromagnetic signal to generate shallow-GPR data or deep-GPR data, wherein the shallow-GPR data is used to identify the road surface features and the deepGPR data is used to identify the underground features;

selectively activate one GPR sensor of the more than one GPR sensors based on a map of the underground features and coordinating with a map of surface localization features, when a location of the vehicle on the surface indicates that the one GPR sensor of the more than one GPR sensors is best positioned to detect the underground features; and adjust operational parameters based on at least one of the road surface features and the underground features.

15. The non-transitory computer readable medium of claim 14, wherein the computer readable medium further comprises instructions that, when executed by the computing system, cause the computing system to:

compare the deep-GPR data identifying the underground features with the map of underground features; and locate the vehicle to a position on a road based upon the comparison of the deep-GPR data identifying the underground features with the map of the underground features; and adjust operational parameters based on the position.

16. The non-transitory computer readable medium of claim 15, wherein the computer readable medium further comprises instructions that, when executed by the computing system, cause the computing system to locate the vehicle to a position in a lane.

17. The non-transitory computer readable medium of claim 14, wherein the GPR sensor is on the vehicle and is suspended above the ground surface.

18. The non-transitory computer readable medium of claim 14, wherein the computer readable medium further comprises instructions that, when executed by the computing system, cause the computing system to adjust a height of the GPR sensor to avoid damage to the GPR sensor based upon the ground surface features.

19. The non-transitory computer readable medium of claim 14, wherein the computer readable medium further comprises instructions that, when executed by the computing system, cause the computing system to adjust a frequency of the GPR sensor based upon the ground surface features.

* * * * *